United States Patent Office 3,431,251
Patented Mar. 4, 1969

3,431,251
TRIAZOLE TRIAZINES AND METHOD OF PREPARATION
Martin Hauser, Stamford, Conn., assignor, by mesne assignments, to the United States of America as represented by the Secretary of the Navy
No Drawing. Filed Sept. 2, 1965, Ser. No. 484,774
U.S. Cl. 260—140
Int. Cl. C07d 55/06; C07c 115/00; C06c 1/04
7 Claims

ABSTRACT OF THE DISCLOSURE

High nitrogen monomers and polymers having 70 to 75% nitrogen prepared by flooding a mixture of guanazole and sodium nitrite with concentrated hydrochloric acid and subsequent reaction with triaminoguanidine. These materials are useful in formulating solid rocket fuel.

---

This invention relates to new high nitrogen monomers and polymers and to the preparation thereof, and particularly those based on guanazole.

In formulating rocket propellants much research has been conducted to find high nitrogen-containing compounds which require less oxidizer for burning than compounds with large amounts of carbon. The present invention is for monomers and polymers having 70 to 75% nitrogen content which may be raised to almost 80%. This is far more nitrogen than other polymers prepared for similar purposes, e.g., polyethylene hydrazine (58% nitrogen). In addition, these new polymers have no C—C bonds as in polyethylene hydrazine and polyvinyltetrazole.

It is therefore an object of the present invention to provide high nitrogen content compositions for use as propellant binders.

Another object is to provide a simple and economical method for the synthesis of high nitrogen containing polymers.

A further object is to provide new compositions which have great energy release on burning.

Still another object is to provide high nitrogen monomers for use as solid rocket fuels.

Other objects, features, and many of the attendant advantages of this invention will become readily appreciated as the same becomes better understood by reference to the following detailed description.

According to the present invention diazotization and autocoupling of guanazole yields poly(3-diazoamino-1,2,4-triazole) along with the corresponding dimer, 1,3-bis[3-(5-amino-1,2,4-triazolyl)]triazene, and trimer, 3,5-bis-[3-(5-amino-1,2,4 - triazolyl)]triazenyl - 1,2,4 - triazole. Conversion of 3-amino-5-nitrosamino-1,2,4-triazole to the diazonium salt and coupling with guanazole also gives the dimer which can be converted to higher analogs. The compounds are readily prepared by flooding a mixture of guanazole and sodium nitrite with concentrated hydrochloric acid at 25° C. The resulting solution is chilled for one-half hour, filtered, and added to a cold solution of guanazole in water. A precipitate forms which is filtered and washed with boiling water. The water-insoluble material is poly(diazoaminotriazole). The water washes on chilling give a precipitate of 1,3-bis-[3-(5-amino-1,2,4-triazolyl)]triazene. The original reaction filtrate, on standing, gives a precipitate of 3,5-bis[3-(5-amino-1,2,4-triazolyl) (triazenyl)]-1,2,4-triazole. These materials are converted to their triaminoguanadinium salts by reaction with triaminoguanidine in water at 25° C.

The invention will be more fully described by the following examples which illustrate methods of practicing the inventions.

EXAMPLE I 1,3-bis-[3-(5-amino-1,2,4-triazolyl)]triazene

A mixture consisting of 2.0 grams (0.016 mole) of 3-amino-5-nitrosamino-1,2,4-triazole, having the structural formula,

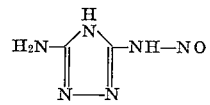

and 50 ml. of concentrated hydrochloric acid was stirred one hour at 25° C. The chilled solution was then added to a cold solution of 1.6 grams (0.016 mole) of 3,5-diamino-1,2,4-triazole in 50 ml. of water. After one hour, the precipitate which formed was filtered, dried and recrystallized from methanol to give 2.1 grams (46.5% yield) of bright-yellow needles which had a melting point of 187° C. This was the dimer, 1,3-bis-[3-(amino-1,2,4-triazolyl)]triazene having the structural formula

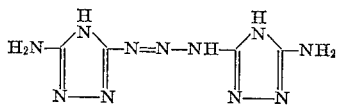

but was obtained herein as the dihydrochloride.

An elemental analysis for $C_4H_7N_{11} \cdot 2HCl$ is as follows:
Calculated: C, 17.0; H, 3.2; N, 54.6; Cl, 25.2. Found: C, 16.7; H, 3.5; N, 54.4; Cl, 24.8.

EXAMPLE II 3,5-bis-{[3-(5-amino-1,2,4-triazolyl)]triazenyl}-1,2,4-triazole

A solution of 0.69 gram (0.01 mole) of sodium nitrite in 10 ml. of water at 5° C. was slowly added to a cold slurry of 2.8 grams (0.01 mole) of poly(3-diazoamino-1,2,4-triazole) in 100 ml. of 10% hydrochloric acid. A clear solution was rapidly obtained. To this solution was added 1.0 gram (0.01 mole) of 3,5-diamino-1,2,4-triazole in 50 ml. of water. A precipitate resulted which was filtered and washed thoroughly with boiling water to give 1.8 grams (56%) of the trimer, 3,5-bis{[3-(5-amino-1,2 4-triazolyl)]triazenyl}-1,2,4-triazole having the structural formula

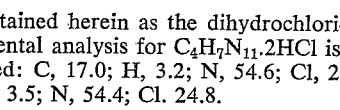

It is an orange-red solid having a melting point greater than 300° C. A recrystallization solvent could not be found and microanalysis was performed on the crude, washed material.

An elemental analysis for $C_6H_9N_{17}$ is as follows:
Calculated: C, 22.6; H, 2.8; N, 74.6. Found: C, 22.7; H, 2.8; N, 74.6.

EXAMPLE III

Poly(3-diazoamino-1,2,4-triazole)

A mixture of 2.0 grams (0.016 mole) of 3-amino-5-nitrosamino-1,2,4-triazole and 50 ml. of concentrated hydrochloric acid were stirred one hour at 25° C., then chilled to 10° C. and neutralized with 5 N sodium hydroxide. The resulting precipitate was filtered, washed with boiling water, and dried to give 0.78 gram (45% yield)

of the polymer, poly(3-diazoamino-1,2,4-triazole) having the structure

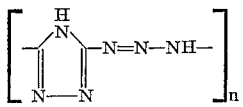

The product is a dark-red, amorphous solid with a melting point greater than 300° C. Microanalyses of the polymer varied with the molecular weight of the polymer but were in the following range for $C_2H_2N_6$:

Calculated: C, 21.5–22.5; H, 2.0–2.5; N, 75–76. Found: C, 21.8; H, 1.8; N, 76.4

EXAMPLE IV

Diazotization of 3,5-diamino-1,2,4-triazole—coupling with 3,5-diamino-1,2,4-triazole Data on this reaction is summarized in Table I, hereinbelow. A typical experiment was run as follows: A finely powdered, dry mixture of 5.0 grams (0.05 mole) of 3,5-diamino-1,2,4-triazole and 10.4 grams (0.15 mole) of sodium nitrite were flooded with 100 ml. of concentrated hydrochloric acid. The mixture was stirred several minutes, chilled for 0.5 hour, and filtered. The cold filtrate was added, with vigorous stirring, to 7.5 grams (0.075 mole) of 3,5-diamino-1,2,4-triazole in 100 ml. of water. The resulting precipitate was filtered, dried and extracted with three 200 ml. portions of boiling water. The water insoluble material was the polymer, poly(3-diazoamino-1,2,4-triazole).

The direct diazotization and auto-coupling of 3,5-diamino-1,2,4-triazole proceeded readily. However, some difficulties were encountered in separation and determination of yields of the various products. Treatment of one mole of 3,5-diamino-1,2,4-triazole with one mole of sodium nitrite followed by coupling with an additional mole of 3,5-diamino-1,2,4-triazole, yielded 31% of the dimer, 1,3-bis[3-(amino-1,2,4-triazolyl)]-triazene and 11% of the polymer, poly(3-diazoamino-1,24,4-triazole). These two materials were separated by treating the reaction precipitate with boiling water. The insoluble polymer was removed by filtration and the dimer was then recovered by concentration of the aqueous extract. Under these conditions none of the trimer, 3,5-bis{[3-(5-amino-1,2,4-triazolyl)]triazenyl}-1,2,4-triazole was isolated probably due to the fact that the trimer merely represents a specialized case of the polymer poly(3-diazoamino - 1,2,4 - triazole) and has similar solubility characteristics. The primary differentiation between the dimer, 1,3-bis[3-(amino-1,2,4-triazolyl)]-triazene and the higher homologs is that the dimer is amphoteric while the trimer and polymer are acidic.

As the ratio of sodium nitrite to 3,5-diamino-1,2,4-triazole was increased, the ratio of yields of the polymer and dimer was observed and is set out in Table I. With large excesses of nitrite, the yield of polymer was diminished, but the yield of dimer was increased. This increase may be a function of excess nitrite diazotizing the guanazole used in the coupling step as well as acting as an oxidizing agent. During the course of some of these reactions, particularly those at three-to-one or higher excess, it was noted that on standing, the reaction filtrates deposited additional material. These proved to be mixtures of the dimer and trimer. Evidently, the trimer is somewhat more acid-soluble than the polymer and tends to precipitate more slowly. The figures given in Table I represent the average of several runs.

TABLE I.—DIAZOTIZATION OF 3,5-DIAMINO-1,2,4-TRIAZOLE, COUPLING WITH 3,5-DIAMINO-1,2,4-TRIAZOLE

| Mole ratio, sodium nitrite/ 3,5-diamino-1,2,4-triazole | Yield, percent (dimer) 1,3, bis[3-(amino-1,2,4-triazolyl)] triazene | Yield, percent (trimer) 3,5-bis-[3-(5-amino-1,2,4-triazolyl)]-triazenyl-1,2,4-triazole | Yield, percent (polymer) poly(3-diazo-amino-1,2,4-triazole) |
|---|---|---|---|
| 1 | 31 |  | 11 |
| 2 | 22 |  | 30 |
| 3 | 6 | 3 | 49 |
| 4 | 10 | 4 | 34 |

A brief investigation was also made of the effect on product distribution of varying the amount of 3,5-diamino-1,2,4-triazole used for coupling. It was found that above the stoichiometric amount there was essentially no variation of the yields of the polymer, dimer and trimer, set out in Table I above, but that the rate of coupling appeared to be more rapid with excess 3,5 - diamino - 1,2,4 - triazole present.

Obviously many modifications and variations of the present invention are possible in the light of the above teachings. It is therefore to be understood that within the scope of the appended claims the invention may be practiced otherwise than as specifically described.

What is claimed is:
1. The method of preparing poly(3-diazoamino-1,2,4-triazole) which comprises
   reacting in situ one mole of 3,5-diamino-1,2,4-triazole in hydrochloric acid and one mole of sodium nitrite.
2. The method of preparing 1,3,-bis-[3-(5-amino-1,2,4-triazolyl)]triazene which comprises
   reacting equimolar quantities of 3,5-diamino-1,2,4-triazole in hydrochloric acid and sodium nitrite and
   coupling with an equimolar quantity of 3,5-diamino-1,2,4-triazole.
3. The method of preparing 3,5-bis-{[3-(5-amino-1,2,4-triazolyl)]triazenyl}-1,2,4-triazole which comprises
   reacting one mole of poly(3-diazoamino-1,2,4-triazole) in hydrochloric acid with one mole of sodium nitrite, and
   coupling with one mole of 3,5-diamino-1,2,4-triazole.
4. The method of preparing poly(3-diazoamino-1,2,4-triazole) which comprises
   reacting 3-amino-5-nitrosamino - 1,2,4 - triazole and hydrochloric acid for one hour at 25° C., then
   neutralizing the resulting solution at 10° C. with sodium hydroxide.
5. Poly(3-diazoamino-1,2,4-triazole).
6. 1,3-bis[3-(5-amino-1,2,4-triazolyl)]triazene.
7. 3,5 - bis{[3 - (5 - amino - 1,2,4 - triazolyl)]triazenyl} 1,2,4-triazole.

References Cited

UNITED STATES PATENTS 2,064,817   12/1936   Brün _____ 260—140
2,978,290   4/1961   Bossard et al. _____ 260—140 XR

FOREIGN PATENTS 1,291,549   3/1967   France.

OTHER REFERENCES

Berg et al.: J. Chem. Soc. (London), vol. of 1963. pp. 4617–4625.

FLOYD D. HIGEL, *Primary Examiner.*

U.S. Cl. X.R.

44—5; 149—109; 260—308